United States Patent
Moore

(10) Patent No.: US 6,690,413 B1
(45) Date of Patent: Feb. 10, 2004

(54) TRACTOR-TRAILER VIEWING SYSTEM

(76) Inventor: Michael S. Moore, 707 Sunrise Ave., #127, Roseville, CA (US) 95661

( * ) Notice: Subject to any disclaimer, the term of this patent is extended or adjusted under 35 U.S.C. 154(b) by 0 days.

(21) Appl. No.: 09/475,366

(22) Filed: Dec. 30, 1999

Related U.S. Application Data

(60) Provisional application No. 60/130,535, filed on Apr. 21, 1999.

(51) Int. Cl.$^7$ ................................................. H04N 7/18
(52) U.S. Cl. ........................ 348/148; 348/169; 382/103
(58) Field of Search ............................... 348/148, 143, 348/180, 169; 382/103, 104, 106, 271; 340/903; 358/153; 187/227

(56) References Cited

U.S. PATENT DOCUMENTS

| | | | |
|---|---|---|---|
| 4,155,100 A | * 5/1979 | Hill | 358/153 |
| 4,214,266 A | 7/1980 | Myers | 358/108 |
| 4,969,707 A | 11/1990 | Hopkins | 350/96.25 |
| 5,027,200 A | 6/1991 | Petrossian et al. | 358/103 |
| 5,530,421 A | 6/1996 | Marshall et al. | 340/436 |
| 5,541,778 A | 7/1996 | DeFlorio | 359/843 |
| 5,586,620 A | * 12/1996 | Dammeyer et al. | 187/227 |
| 5,670,935 A | 9/1997 | Schofield et al. | 340/461 |
| 5,684,647 A | 11/1997 | Rouleau | 359/843 |
| 5,719,713 A | 2/1998 | Brown | 359/843 |
| 5,760,828 A | 6/1998 | Cortes | 348/143 |
| 5,793,308 A | * 8/1998 | Rosinski et al. | 340/903 |
| 5,835,291 A | 11/1998 | Takayama | 359/843 |
| 5,856,887 A | * 1/1999 | Standen et al. | 359/843 |
| 5,892,855 A | * 4/1999 | Kakinami et al. | 348/119 |
| 5,982,945 A | * 11/1999 | Neff et al. | 382/271 |
| 6,268,803 B1 | * 7/2001 | Gunderson et al. | 340/903 |

* cited by examiner

Primary Examiner—Chris Kelley
Assistant Examiner—George A Bugg
(74) Attorney, Agent, or Firm—Dean A. Craine

(57) ABSTRACT

This invention relates to motor vehicles, and, more particularly, to a rear viewing system for tractor-trailer vehicles. An automated, universal trailer rear viewing system that is integrated in its entirety on the head or pulling portion of a pivotally connected articulated vehicle. The system includes: (a) at least one image capturing device mounted on the tractor designed to tilt, pan and focus on a target object or an area around the trailer; (b) a computer located inside the tractor coupled to the image capturing device; (c) an image capturing and comparative software program loaded into the memory of the computer capable of processing the image file of the target object transmitted from the image capturing device, and capable of generating control commands to the image capturing device so that an image of the target object is maintained as the system is activated; (d) at least one adjustable viewing camera also coupled to the computer that automatically adjusts the viewing camera tilting, panning and focusing according to the movement of the image capturing device; and, (e) at least one display monitor located near the driver that is coupled to the viewing camera so that the image seen thereby may be seen by the driver.

24 Claims, 8 Drawing Sheets

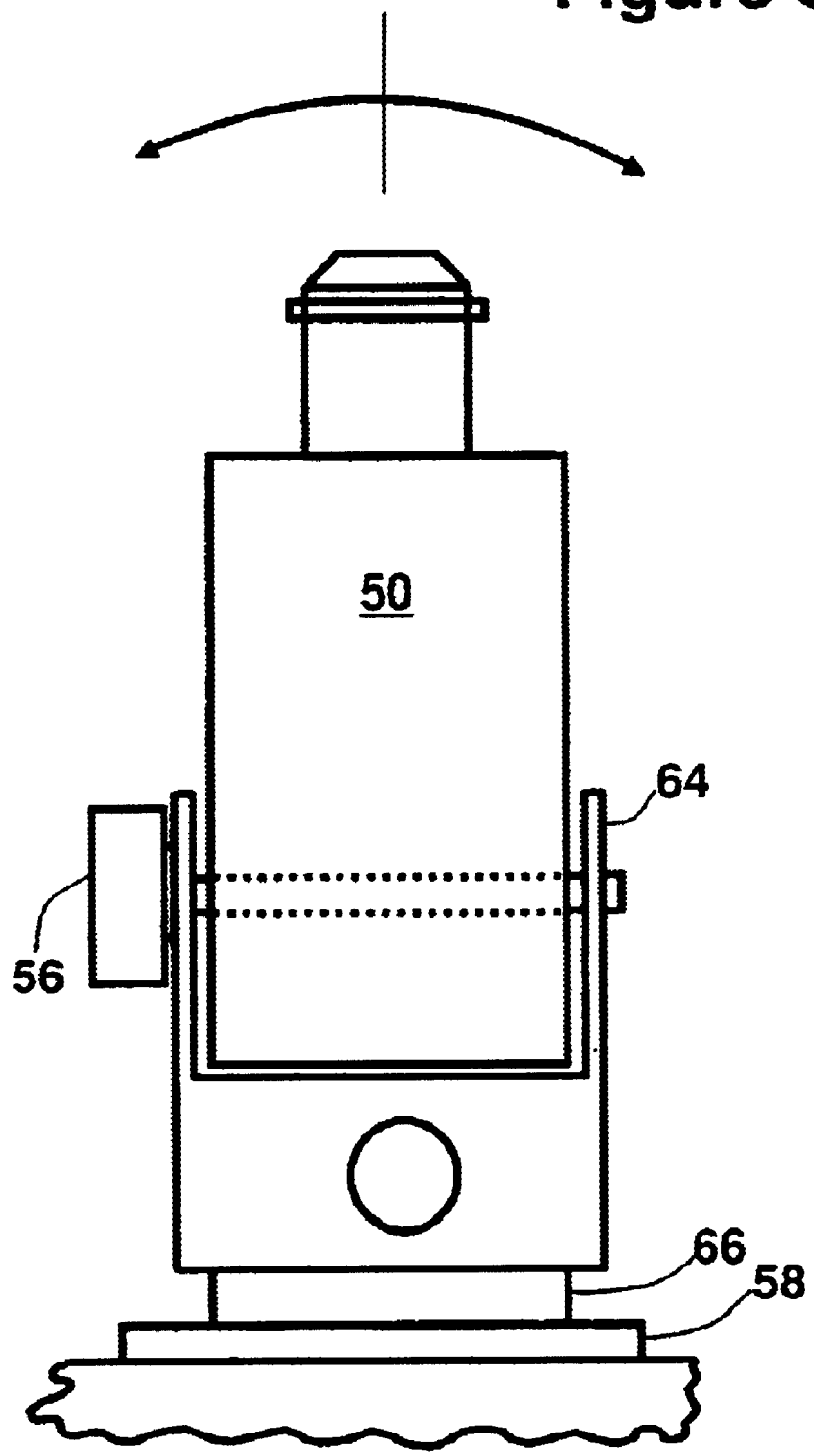

TRACTOR-TRAILER VIEWING SYSTEM

This is a utility patent application based on a provisional patent application filed on Apr. 21, 1999, (Ser. No. 60/130,535).

BACKGROUND OF THE INVENTION

1. Field of the Invention

This invention relates to viewing systems used on motor vehicles, and, more particularly, to a rear and side viewing system for heavy tractor-trailer motor vehicles.

2. Description of the Related Art

It is widely known that the vision of a driver of a tractor-trailer motor vehicle of specific areas located behind and to the sides of the tractor and trailer may be poor or blocked. In fact, these specific areas, commonly known as "blind spots", are a major cause of accidents involving tractor-trailer motor vehicles. Visibility of these areas is especially important when turning the motor vehicle sharply to the left or right and when backing up, as shown in FIG. 2. Since many tractor-trailer motor vehicles are driven without a second individual acting as a guide or spotter to assist the driver, drivers are often required to turn or back up their tractor-trailer motor vehicles without actually knowing if an object, such as another motor vehicle or an individual, is located in these "blind spot" areas.

In the trucking industry, it is common practice for drivers to operate as independent contractors who own and operate their own tractors. Drivers will use their tractor to haul many types and sizes of trailers owned by different companies. Even in large trucking companies, it is common for drivers to operate one tractor and haul many types and sizes of trailers. Unfortunately, each type and size of trailer has it own unique blind spots that the driver must be familiar with in order to haul the trailer safely.

What is needed is an improved viewing system for a tractor-trailer motor vehicle that allows drivers to see these blind spots, that is easy to use, is assembled completely on the tractor, and can be used with any type and size of trailer.

SUMMARY OF THE INVENTION

It is an object of the invention to provide an improved viewing system for a tractor-trailer motor vehicle.

It is another object of the present invention to provide such a system that enables drivers to see blinds spots located behind and to the sides of their tractor-trailer motor vehicles.

It is another object of the invention to provide such a system that is solely mounted on the tractor so that the system may be used with many types and sizes of trailers.

These and other objects of the invention are met by providing an improved tractor-trailer viewing system designed to allow the driver of a tractor-trailer motor vehicle to view blind spots located behind and around the tractor and trailer. The system significantly improves the quantity and quality of visual information available to the driver above that provided by a standard mirror system. It is expected that such a system will improve overall highway safety and save lives.

The system is designed to constantly and automatically provide to the driver images of selected blind spots located behind and to the sides of the tractor and trailer. The system includes: (a) at least one real-time image capturing device mounted on the tractor designed to tilt, pan and focus on a target object located on or closely associated with the trailer; (b) a computer located inside the tractor coupled to the image capturing device; (c) an image capturing and comparative software program, hereinafter referred to as an image capturing software program, loaded into the working memory of the computer capable of processing an image file of the target object transmitted from the image capturing device, and capable of generating control commands to the image capturing device so that an image of the target object is constantly maintained as the tractor and trailer move relative to each other; (d) at least one adjustable viewing means also coupled to the computer that automatically adjusts the viewing means tilting, panning and focusing functions to match the movements of the image capturing device so that a desired image is constantly transmitted to the driver; and, (e) at least one display monitor located near the driver coupled to the adjustable viewing means so that the image taken thereby may be seen by the driver.

During assembly, a stored image file of a desired target object, such as the rearward view of a rear tire on the trailer taken from the back of the tractor, is selected from an image database containing a plurality of image files of other target objects taken from this location and downloaded into the image capturing software program. The image files may be created earlier by the image capturing device and then stored in the image database. The image capturing device aims and focuses on the target object and transmits a real-time, actual image file of it to the computer. The image capturing software program then processes the actual image file and compares it to a stored image file. The image capturing software program then generates and transmits appropriate control commands to the servos connected to the image capturing device so that the actual image file transmitted by the image capturing device constantly matches the stored image file. When driving, the relative positions of the tractor and trailer constantly change, which causes the image capturing device to constantly adjust its position so that the actual image file matches the stored image file.

In the preferred embodiment, the image capturing device and the viewing means are separate cameras connected to separate servos and electrical circuits that control their function and operation. The control commands that control the tilting, panning and focusing movements of the viewing camera are coordinated to match the tilting, panning and focusing actions of the image capturing device, so that a desired blind spot is continuously viewed by the viewing camera as the motor vehicle is driven. It should be understood, however, that their image capturing and view functions may by carried out by one camera, hereinafter called a combination camera. Optional manual control means is also provided that allows the driver to adjust the tilting, panning and focusing actions of the viewing camera to view other desired areas.

BRIEF DESCRIPTION OF THE DRAWINGS

FIG. 8 is a top elevational view of the combination shown in FIG. 7 showing its panning movement.

DESCRIPTION OF THE PREFERRED EMBODIMENT(S)

Figure 1:
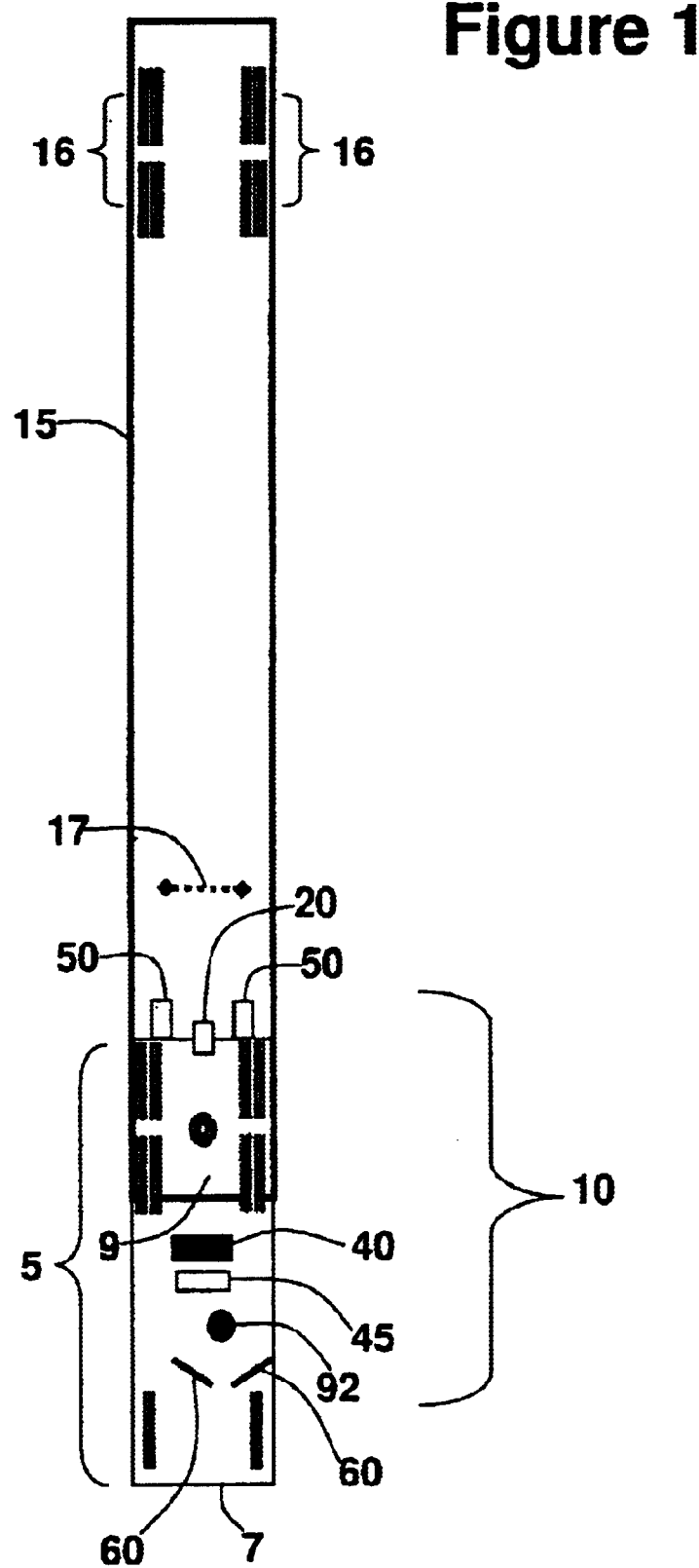
FIG. 1 is a top plan view of a tractor-trailer motor vehicle with one embodiment of the viewing system described herein being used on a standard tractor-trailer motor vehicle.
Figure 2:
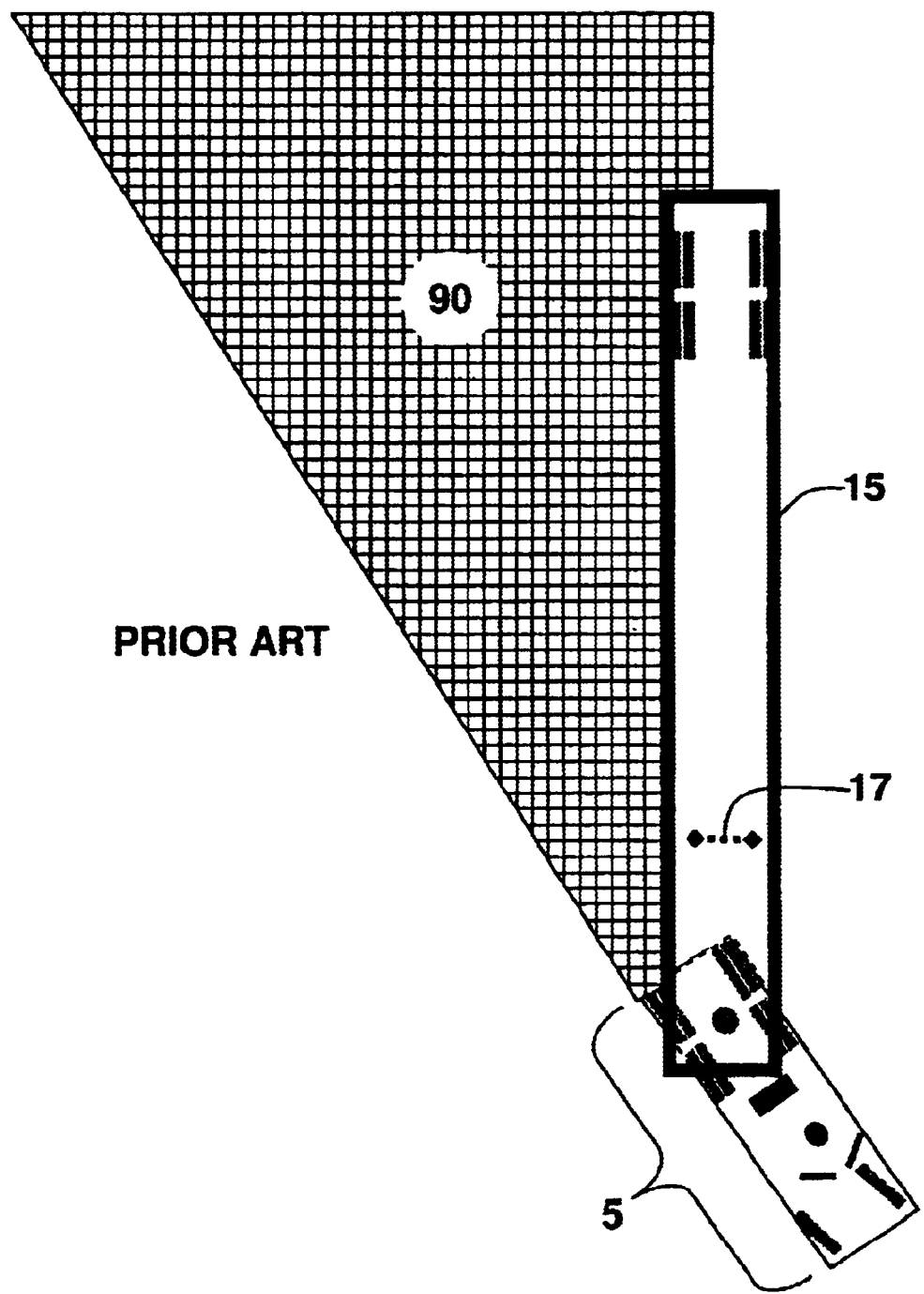
FIG. 2 is an illustration of a tractor-trailer motor vehicle found in the prior art shown turning left with a blind spot depicted adjacent to the right side of the trailer.

Referring to the FIGS. 1, 3–8, wherein like reference numbers indicate similar elements, there is shown a tractor-trailer rear viewing system 10 used by a driver 92 to view areas normally considered blind spots 90 when operating a tractor-trailer motor vehicle 4, as shown in FIG. 2.

The system 10 includes at least one image capturing camera 20 mounted on the bed 9 of a tractor 5, a computer 40 located inside the tractor 5, an image capturing software program 45 loaded into the memory of the computer 40, at least one viewing camera 50 mounted on the tractor 5, and at least one display monitor 60 mounted inside the cab 7 of the tractor 9.

Figure 3:
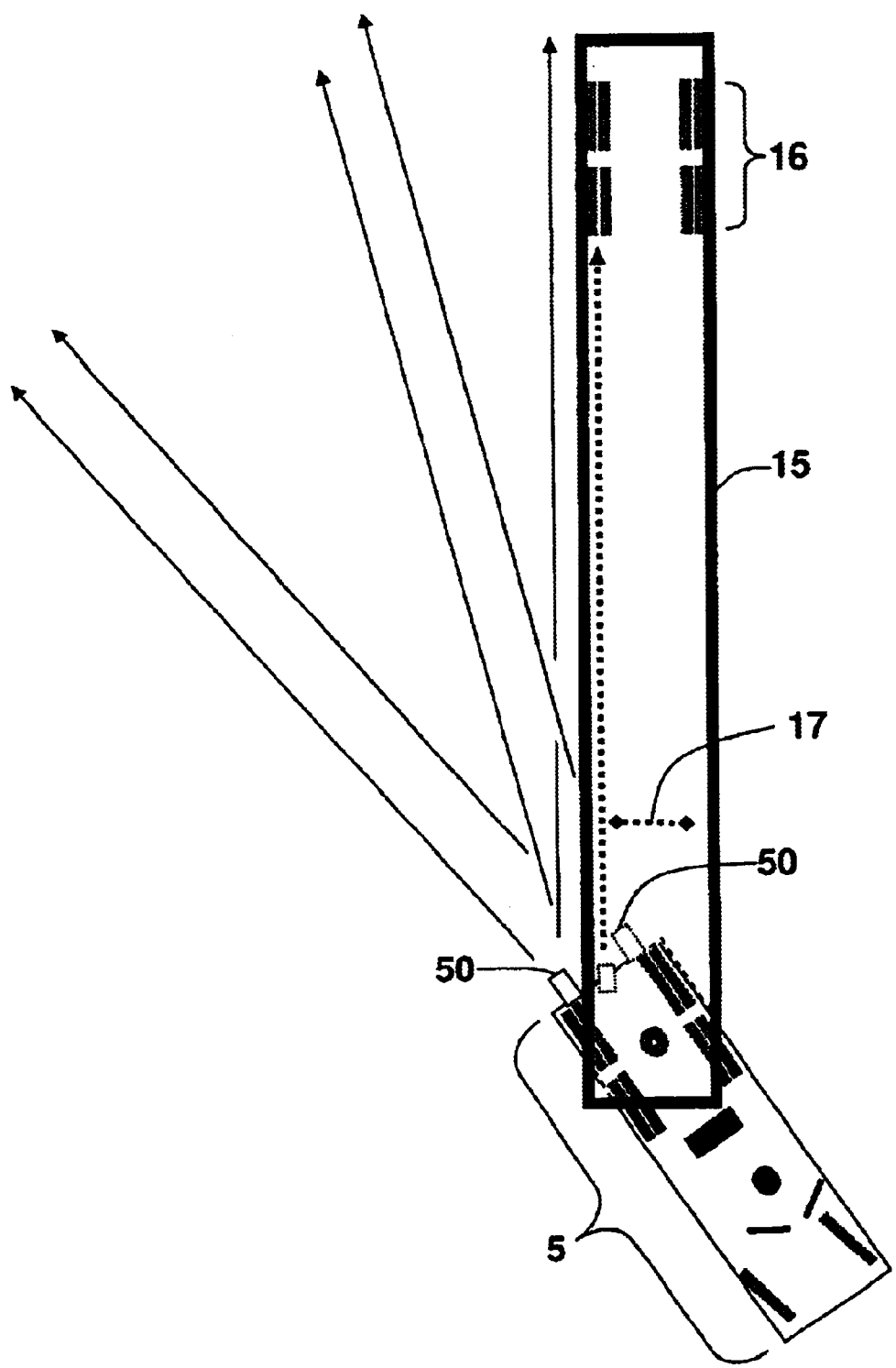
FIG. 3 is an illustration of a tractor-trailer motor vehicle using the system described herein, turning left as shown in FIG. 2, depicting the viewing system being used to view the area previously regarded as a blind spot.
Figure 4:
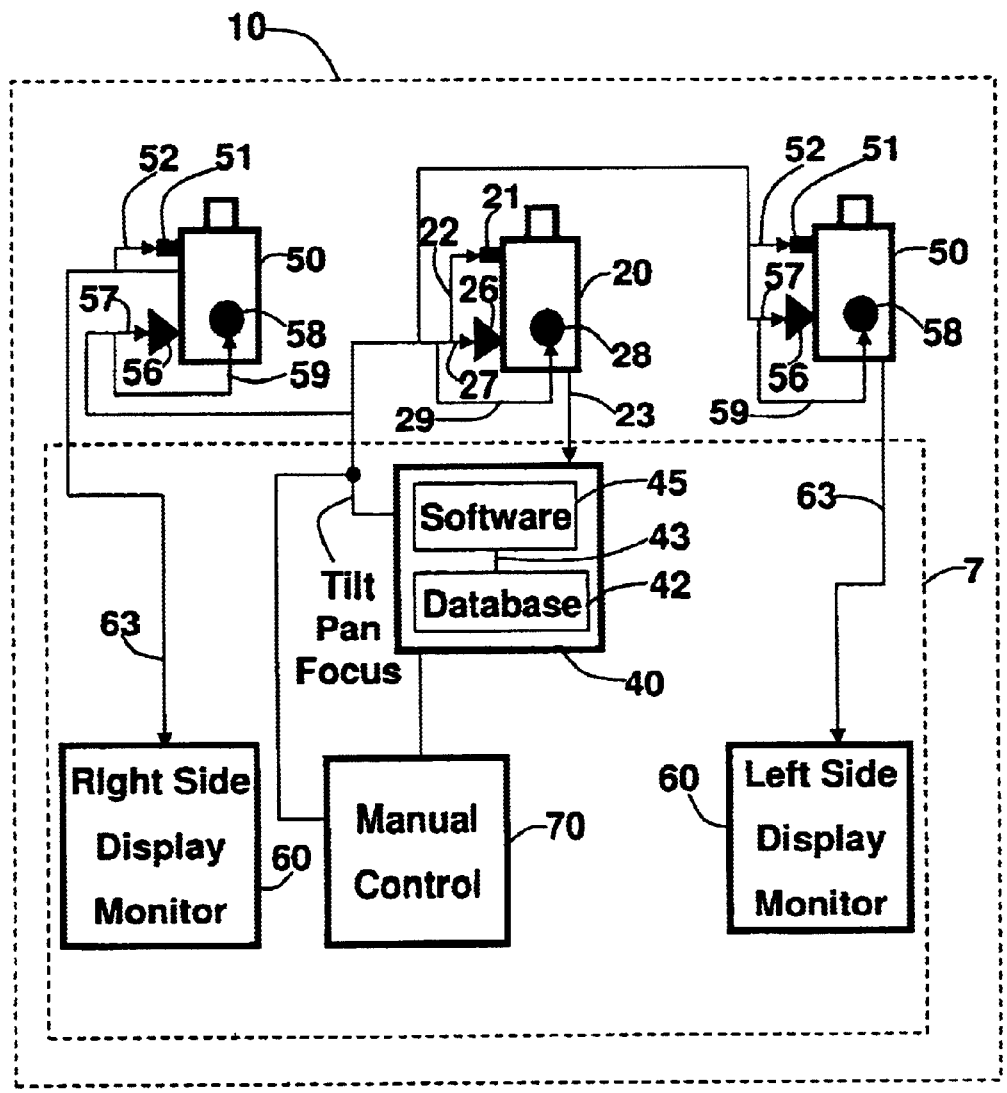
FIG. 4 is a schematic diagram showing one embodiment of the system using one image capturing camera and two viewing cameras.

In the first embodiment shown in FIGS. 1, 3, and 4, the system 10 includes one centrally aligned image capturing camera 20 and two laterally positioned viewing cameras 50 all coupled to a computer 40. The computer 40 includes working memory that is loaded with an image capturing software program 45 and an image database 42 that contains a plurality of stored image files 43 of various trailer-related targeted objects. During operation, the image capturing camera 20 focuses on the targeted object, (rear tire 16 in FIG. 3), and transmits an actual image file, denoted 23, to the computer 40. An image file 43 is then selected from the image database 42 and used by the image capturing software program 45. When the actual image file 23 is transmitted to the computer 40, the image capturing software program 45 processes the actual image file 23 and compares it to the stored image file 43. If the actual image file 23 does not match the stored image file 43, the image capturing software program 45 generates appropriate tilting and panning control commands 27, 29 to servos 26, 28 attached to brackets that mount the image capturing camera 20 to the tractor 5, and focus control commands 22 to the focus control 21 located on the camera 20 so that the actual image file 23 matches the stored image file 43. During operation, the image capturing software program 45 constantly compares the actual image file 23 with the stored image file 43 to constantly adjust the x-y axis positions and focus of the image capturing camera 20.

The system 10 may include one or more adjustable viewing cameras 50 coupled to the computer 40 and to at least one display monitor 60. Both the computer 40 and display monitor 60 are located inside the cab 7 of the tractor 5. The viewing cameras 50 are used to generate one or more image views 63 of a blind spot 90 or another desired area located adjacent to the trailer 15 which are transmitted to the display monitor 60. In FIGS. 3 and 4, one right and one left viewing camera 50 is spaced apart and mounted on the rear surface of the tractor 5. Each viewing camera 50 is connected to the tractor 5 with an X and Y axis adjustable brackets 64, 66, capable of moving along its X-Y axis by separate servos 56, 58. The servos 56, 58 and the focus controls 51 on the viewing cameras 50 are controlled by the computer 40 and the software program 45. When the image capturing software program 45 produces and transmits tilting, panning and focusing control commands 22, 27, and 29, respectively, to the image capturing camera 20, it also produces and transmits complimentary tilting, panning and focusing control commands 52, 57, 59, respectively, to each viewing camera 50. During assembly, the software program 45 must be calibrated so that the appropriate control commands 52, 57 and 59 are transmitted to each viewing camera 50.

In the preferred embodiment, the image capturing camera 20 is rearward and centrally mounted between the rear frame rails on the tractor 5 at or near the fifth wheel. When a trailer 15 is attached to the tractor 5, the image capturing camera 20 is located under the trailer 15. The two viewing cameras 50 are spaced apart and rearward, laterally mounted on the rear surface of a transverse member on the tractor 5 on opposite sides of the image capturing camera 20 and below the trailer 15. It should also be understood that the system 10 may be used with one viewing camera 50 or with three or more viewing cameras 50.

Figure 5:
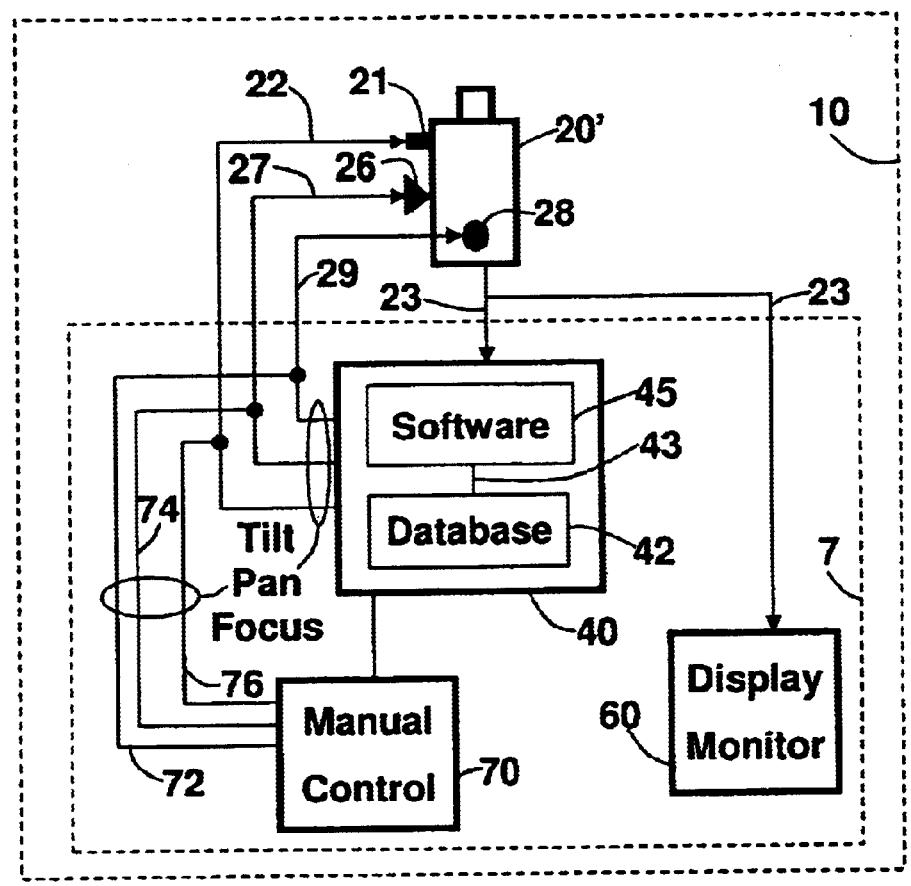
FIG. 5 is a schematic diagram showing a second embodiment of the system using one combination camera.

In FIG. 5, a second embodiment of the system 10 is shown in which the functions of the image capturing device and a viewing camera are combined into one combination camera, denoted 20'. In this embodiment, actual image file 23 is transmitted both to the computer 40 and to the display monitor 60 located in the tractor 5. One drawback with this design is that it does not offer a good view of either side of the trailer 15 unless the tractor 5 is turned approximately 30 degrees or more. For this reason, when one image capturing camera 20 or one combination camera 20' is used, it is recommended that it focus a central undercarriage target, such as the landing gear 17 rather than the rear tire 16. When the image capturing camera 20 or combination camera 20' focuses on a rear tire 16, the tractor's landing gear 17 obscures the rearward view when the tractor 5 is turned approximately 60 degrees or more.

Figure 6:
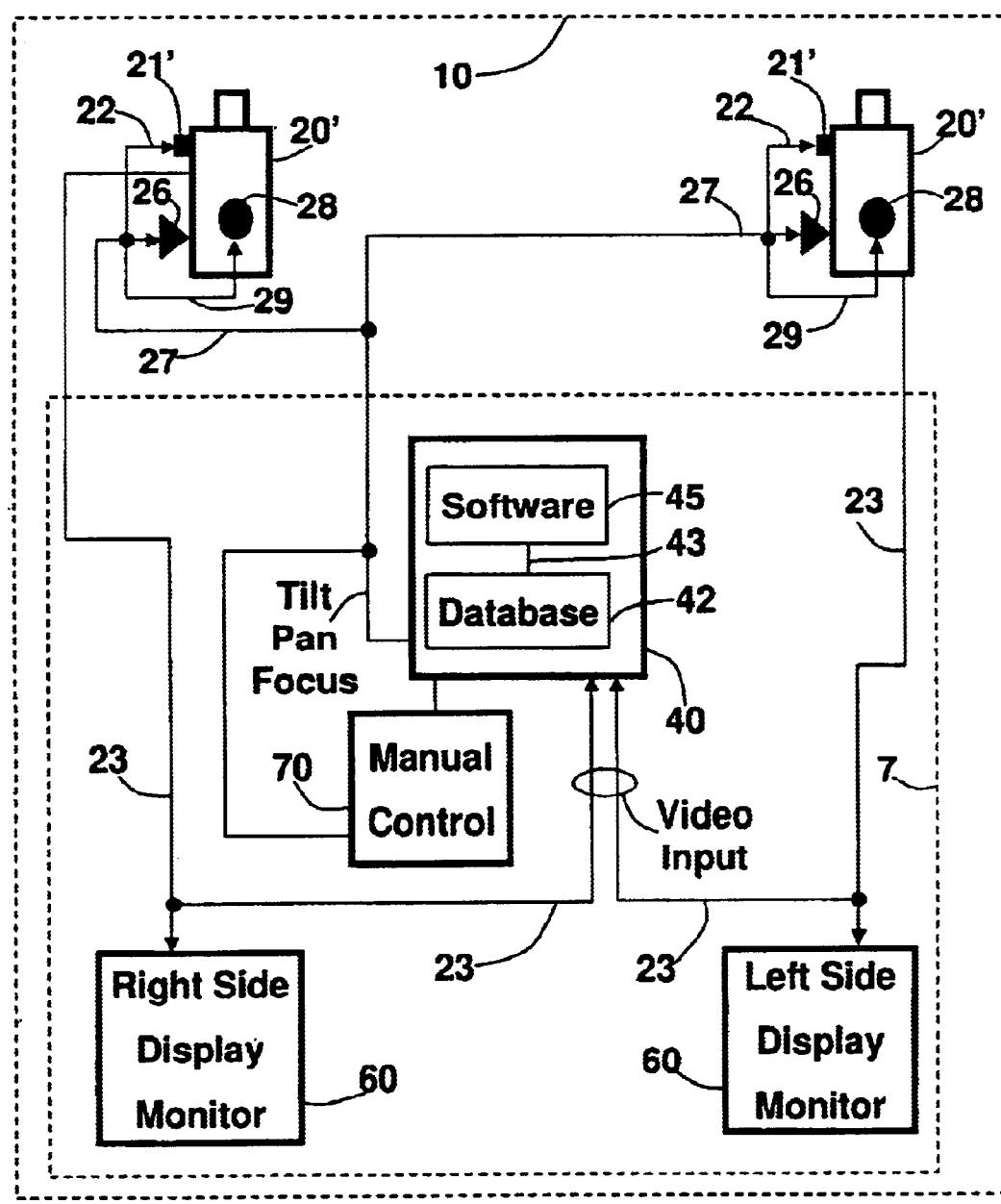
FIG. 6 is a schematic diagram showing a third embodiment of the system using two combination cameras.
Figure 7:
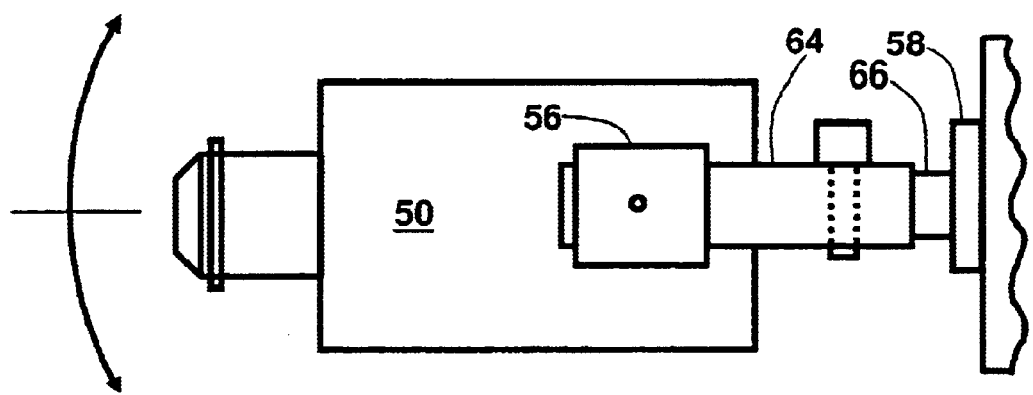
FIG. 7 is side elevational view showing a combination camera showing the up and down tilting movement.

In a third embodiment shown in FIG. 6, two combination cameras 20' are used. Each combination camera 20' is rearward mounted and spaced apart on the rear transverse member on the tractor. Each combination camera 20' is coupled to the computer 40 and to a display monitor 60 located on the same side of the tractor 5.

One or more display monitors 60 are provided that should be mounted close to, and within easy viewing range of the driver. These display monitors 60 should be positioned to the left and right of the driver, with the left display monitor always showing views of the viewing camera 50 mounted on the left side of the motor vehicle, and the right display monitor 60 always showing views of the right side of the motor vehicle. Mounting the display monitors 60 in this manner maintains the natural tendency for the driver to look to the left for left-side views, and to the right for right-side views, similar to using standard vehicle mirrors. The image capturing software program 45 loaded into the computer 40 may be designed to automatically switch to the viewing cameras 50 to display the most useful view of the vehicle blind spot, or other desirable view. As shown in FIGS. 4–6, a manual control 70 is provided inside the tractor 5 which enables the driver to selectively control the position of the image capturing camera 20 or the combination camera 20' or the viewing cameras 50.

In the preferred embodiment, the computer 40 is a PC-based computer loaded with the icon-control operating system, such as WINDOWS 98, sold by Microsoft, Inc. of Redmond, Washington. The image capturing software program 45 is a typical machine vision software program available today. Such software programs 45 may be purchased separately or purchased as a "turn-key" system that includes the image capturing devices, the machine vision software program, and the PCI interface boards, including cables. Such programs and systems may be obtained from Cognex Corporation, of Natick, Mass.

As mentioned above, the image capturing camera 20, the viewing camera 50, and the combination camera 20' are attached to the rear rail on the tractor 5 with a bracket that moves along its X and Y axis by two electrically controlled servos 26, 28 capable of being connected to a 12–24 volt system. Such brackets and servos 26, 28 are also available from the image capturing software program companies mentioned above.

EXAMPLE

During assembly, two viewing cameras 50 and a central located image capturing camera 20 are mounted on the tractor 5 as shown in FIG. 4. The computer 40 and two display monitors 60 are placed inside the cab 7 of the tractor 5. The two viewing cameras 50 are connected to the display monitor 60 located on the same side of the driver. A manual control 70 is also provided inside the cab 7 that is used to manually control the orientation of the viewing cameras 50. Suitable size and length wires are then run between the image capturing camera 20 and the computer 40, between the two video cameras 50 and the computer 40, between the display monitors 60 and the computer 40, and between the manual switch 70 and the viewing cameras 50.

Next, a trailer 15 is then attached to the tractor 5. The image capturing software program 45 is then loaded into the memory of the computer 40 along with an image database 42 containing a plurality of image files 43. The image files 43 in the image database 42 are created by the image capturing camera 20 looking rearward to the rear tire 16 of the trailer 15. In the preferred embodiment, the image file 43 is a view taken from a centrally mounted image capturing camera 20 aimed and focused on a rear tire 16. A desired target object on the trailer 15 is selected and an identical stored image file 43 is selected from the image database 42 and downloaded into the computer 40. In this example, the stored image file 43 is an image of the inside right rear tire of the trailer 15 as seen from a central, rear facing image capturing camera 20 mounted on the bed 9 of the tractor 5.

While the trailer 15 is driven, the image capturing camera 20 constantly focuses and transmits an image file of the trailer's rear tire to the computer 40. In order to keep image capturing camera 20 focussed on the tire 16, the computer 40 continuously transmits command control signals 22, 27, 29 to the focus control 21 or 21' servos 26, 28, respectively on the image capturing camera 20. At the same time, command control signals are being transmitted to the servos 56, 58 on the two viewing cameras 50. As a driver is backing up, images are taken by the image capturing camera 20 and transmitted to the central computer 40, which then controls the servos 56, 58 on each viewing camera 50 so that each viewing camera 50 remains focused on the desired blind spot. The display monitor 60 located inside the cab 7 of the tractor 5 is connected to the viewing camera 50 so that the view from each viewing camera 50 may be seen by the driver 92 while driving.

In compliance with the statute the invention described herein has been described in language more or less specific as to structural features. It should be understood, however, that the invention is not limited to the specific features shown, since the means and construction shown, comprise only some of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A tractor-trailer motor vehicle blind spot viewing system, comprising:
   (a) a computer located on a tractor;
   (b) at least one image capturing device mounted on a tractor and aimed rearward and under said trailer when attached to said tractor, the view of said image capturing device designed to adjust, focus on, and track a target object on said trailer when attached to said tractor, said image capturing device connected to said computer and capable of transmitting an image file thereto;
   (c) an image capturing software program loaded into the memory of said computer capable of processing said image file transmitted from said image capturing device, and capable of comparing said image file with a stored image file and generating control commands to said image capturing device so that said image file substantially matches the stored image file when the system is activated;
   (d) at least one adjustable viewing camera mounted on said tractor and aimed rearward and under said trailer when attached to said tractor to view the blind spot created when said tractor is driven in a left or right turn, said blind spot not observable to a driver of said tractor, said viewing camera coupled to said computer;
   (e) at least one display monitor located near the driver coupled to said viewing camera so that the image from said viewing camera may be seen by the driver; and, (f) means to adjust the view of said viewing camera to match the changing view of said image capturing device as said target object moves relative to said image capturing device as said tractor is driven in a left or right turn.

2. The tractor-trailer motor vehicle blind spot viewing system, as recited in claim 1, wherein said image capturing software program is a machine vision software program.

3. The tractor-trailer motor vehicle blind spot viewing system, as recited in claim 2, wherein said means to adjust the view of said viewing camera is said machine vision software program.

4. The tractor-trailer motor vehicle blind spot viewing system, as recited in claim 1, wherein said image capturing device is mounted on or behind the fifth wheel pivot point of said tractor, is rearward facing and focusing on the rear tire of said trailer.

5. The tractor-trailer motor vehicle blind spot viewing system, as recited in claim 1, further including a manual switch coupled to said viewing camera to selectively adjust the viewing position thereof.

6. The tractor-trailer motor vehicle blind spot viewing system, as recited in claim 1, wherein said functions of said image capturing device and said viewing camera are carried out by a single combination camera.

7. The tractor-trailer motor vehicle blind spot viewing system, as recited in claim 1, further including there a second viewing camera coupled to said computer.

8. The tractor-trailer motor vehicle blind spot viewing system, as recited in claim 7, wherein said display monitor is coupled to both said viewing cameras.

9. The tractor-trailer motor vehicle blind spot viewing system as recited in claim 6, further including two combination cameras spaced apart, rearward facing and attached to said tractor.

10. A tractor-trailer motor vehicle blind spot viewing system, comprising:
(a) at least one image capturing camera mounted on a tractor, said image camera being aimed rearward and under a trailer attached to said tractor to view a target object located on said trailer, said image capturing camera capable of generating an image file of a target object;
(b) a computer located on said tractor and coupled to the image capturing camera;
(c) an image capturing software program loaded into said computer capable of processing said image file from said image capturing camera, said image capturing software program also capable of generating control commands to said image capturing camera so that an image of a target object is continuously and automatically adjusted and maintained during use;
(d) at least one adjustable viewing camera mounted on the tractor, said viewing camera being aimed rearward at a blind spot around the trailer, said blind spot being created when said tractor is driven in a left or right turn, objects in said blind spot not being visible to a driver when the tractor is turned, said viewing camera being coupled to said computer so that said image capturing software program may automatically adjust the view of said viewing camera to match the adjusted view of said image capturing camera; and,
(e) at least one display monitor attached to said tractor and coupled to said viewing camera so that the image transmitted from said viewing camera may be seen by a driver.

11. The tractor-trailer motor vehicle blind spot viewing system, as recited in claim 10, wherein said image capturing software program is a machine vision software program.

12. The tractor-trailer motor vehicle blind spot viewing system, as recited in claim 11, wherein said image capturing camera is focused on a rear tire of said trailer.

13. The tractor-trailer motor vehicle blind spot viewing system, as recited in claim 12, further including a manual switch coupled to said viewing camera to selectively adjust the viewing position thereof.

14. The tractor-trailer motor vehicle blind spot viewing system, as recited in claim 10, wherein the apparent tilting, panning and focusing changes in the view of said image capturing camera and said viewing camera are carried out be a single combination camera.

15. The tractor-trailer motor vehicle blind spot viewing system, as recited in claim 12, wherein there are two viewing cameras attached to the tractor on opposite sides of said image capturing camera.

16. The tractor-trailer motor vehicle blind spot viewing system as recited in claim 14, wherein there is one display monitor coupled to each said combination camera.

17. The tractor-trailer motor vehicle blind spot viewing system as recited in claim 14, further including a second combination camera mounted on the tractor, said second combination camera may be aimed rearward and under a trailer attached to the tractor to view an object under said trailer when said tractor-trailer motor vehicle is driven forward or backward in a straight path.

18. A tractor-trailer motor vehicle blind spot viewing system, comprising:
(a) at least one image capturing and viewing combination camera mounted on a tractor, said combination camera capable of generating an image file of a target object, said combination camera being aimed rearward and under the trailer to view a target object on the trailer when the trailer is attached to the tractor;
(b) a computer located on the tractor coupled to said combination camera;
(c) an image capturing software program loaded into said computer capable of processing said image file from said combination camera, said software program also capable of generating commands to adjust the view of said combination camera so that the view of said combination camera changes in response to any change of position of said target object on said trailer so that an image of said target object is maintained during use; and,
(d) at least one display monitor located near the driver that is coupled to said combination camera so that the image seen thereby may be seen by the driver.

19. The tractor-trailer motor vehicle blind spot viewing system, as recited in claim 1, wherein said image capturing device is mounted at or behind the fifth wheel pivot point of said tractor.

20. The tractor-trailer motor vehicle blind spot viewing system, as recited in claim 1, wherein said image capturing device and said view camera is located laterally from said image capturing device.

21. The tractor-trailer motor vehicle blind spot viewing system, as recited in claim 10, wherein said image capturing device is mounted at or behind the fifth wheel pivot point of said tractor.

22. The tractor-trailer motor vehicle blind spot viewing system, as recited in claim 21, wherein said image capturing device and said view camera is located laterally from said image capturing device.

23. The tractor-trailer motor vehicle blind spot viewing system, as recited in claim 18, wherein said combination camera is mounted at or behind the fifth wheel pivot point of said tractor.

24. A method of viewing blind spots on a tractor-trailer motor vehicle, comprising the following steps:
(a). attaching a viewing system to said tractor, said viewing system including an adjustable combination viewing camera mounted on or behind the fifth wheel pivot point of said tractor and aimed rearward and under a trailer attached to said tractor, a computer attached to said combination viewing camera, an image capturing software program loaded into said computer and capable of controlling the direction of the view of said combination camera to maintain the image of a target object viewed by said combination camera while the tractor is driven, and a display monitor visible to a driver and coupled to said combination viewing camera to view an image therefrom;
b. activating said viewing system;
c. aiming the view of said combination viewing camera at an object on said trailer that allows the view of said combination camera to be constantly and automatically adjusted to target a blind spot located around said trailer, objects in said blind spot not constantly visible to a driver to be viewed when said tractor is driven in a turn;
d. operating said tractor; and,
e. viewing said display to view said blind spot.

* * * * *